United States Patent
Lee et al.

(10) Patent No.: US 10,136,339 B2
(45) Date of Patent: Nov. 20, 2018

(54) OPERATION METHOD FOR ACCESS POINT AND OPERATION METHOD FOR RELAY

(71) Applicant: ELECTRONICS AND TELECOMMUNICATIONS RESEARCH INSTITUTE, Daejeon (KR)

(72) Inventors: Jae Seung Lee, Daejeon (KR); Hyoung Jin Kwon, Daejeon (KR); Sok Kyu Lee, Daejeon (KR); Min Ho Cheong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 289 days.

(21) Appl. No.: 14/917,924

(22) PCT Filed: Sep. 10, 2014

(86) PCT No.: PCT/KR2014/008447
§ 371 (c)(1),
(2) Date: Mar. 9, 2016

(87) PCT Pub. No.: WO2015/037904
PCT Pub. Date: Mar. 19, 2015

(65) Prior Publication Data
US 2016/0219591 A1     Jul. 28, 2016

(30) Foreign Application Priority Data

Sep. 10, 2013 (KR) .................. 10-2013-0108768
Sep. 5, 2014 (KR) .................. 10-2014-0118882

(51) Int. Cl.
*H04W 72/04* (2009.01)
*H04W 16/32* (2009.01)
(Continued)

(52) U.S. Cl.
CPC ......... *H04W 16/32* (2013.01); *H04W 40/244* (2013.01); *H04W 52/0206* (2013.01);
(Continued)

(58) Field of Classification Search
CPC ............... H04W 40/244; H04W 16/32; H04W 52/0206; H04W 52/0209; H04W 52/0241
See application file for complete search history.

(56) References Cited

U.S. PATENT DOCUMENTS

| 8,503,349 B2 | 8/2013 | Tamura |
| 2007/0243892 A1* | 10/2007 | Mikami ............... H04W 48/16 455/507 |

(Continued)

FOREIGN PATENT DOCUMENTS

| KR | 10-2010-0128129 A | 12/2010 |
| KR | 10-2011-0035969 A | 4/2011 |
| KR | 10-2013-0067256 A | 6/2013 |

OTHER PUBLICATIONS

International search report for PCT/KR2014/008447 filed on Sep. 10, 2014.
Krishna Gomadam et al., "Approaching the Capacity of Wireless Networks through Distributed Interference Alignment", 2008, pp. 1-10.

*Primary Examiner* — Gbemileke J Onamuti

(57) ABSTRACT

An operating method of an access point (AP) and an operating method of a relay are disclosed in which the AP may determine whether to associate with the relay based on at least one of first information indicating whether use of an overlapping channel is restricted, second information indicating whether an operation using a non-overlapping channel is supported by the relay, and third information indicating whether use of a channel identical to a channel used by the AP is requested.

12 Claims, 9 Drawing Sheets

(51) Int. Cl.
- *H04W 40/24* (2009.01)
- *H04W 52/02* (2009.01)
- H04W 88/08 (2009.01)
- H04W 74/00 (2009.01)
- H04W 84/12 (2009.01)
- H04W 88/04 (2009.01)

(52) U.S. Cl.
CPC ... *H04W 52/0209* (2013.01); *H04W 52/0241* (2013.01); *H04W 74/004* (2013.01); *H04W 74/006* (2013.01); *H04W 84/12* (2013.01); *H04W 88/04* (2013.01); *H04W 88/08* (2013.01); *Y02D 70/00* (2018.01); *Y02D 70/142* (2018.01)

(56) References Cited

U.S. PATENT DOCUMENTS

| | | | |
|---|---|---|---|
| 2010/0165963 A1 | 7/2010 | Chu et al. | |
| 2011/0032883 A1* | 2/2011 | Patil | H04W 74/0841 370/329 |
| 2011/0249622 A1 | 10/2011 | Takeda et al. | |
| 2012/0063369 A1 | 3/2012 | Lin et al. | |
| 2012/0238202 A1 | 9/2012 | Kim et al. | |
| 2013/0201903 A1* | 8/2013 | Takahashi | H04W 16/26 370/315 |
| 2013/0294289 A1* | 11/2013 | Kneckt | H04W 72/082 370/254 |

* cited by examiner

| Disallow overlapping channel (set by root AP) | Relay channel switch capable (set by relay) | Request same channel (set by relay) | Reserved | Reserved | Reserved | Reserved | Reserved |
|---|---|---|---|---|---|---|---|
| 1 | 1 | 1 | 1 | 1 | 1 | 1 | 1 |

551 / 552 / 553

Bits

OPERATION METHOD FOR ACCESS POINT AND OPERATION METHOD FOR RELAY

CROSS REFERENCE TO RELATED APPLICATIONS

The present application is a U.S. National Stage of International Patent Application No. PCT/KR2014/008447 filed Sep. 10, 2014, which claims priority to Korean application number 10-2013-0108768, filed on Sep. 10, 2013, and Korean application number 10-2014-0118882, filed on Sep. 5, 2014, which are incorporated by reference in their entirety.

TECHNICAL FIELD

The present invention relates to an operating method of an access point (AP) and an operating method of a relay.

BACKGROUND ART

Recently, a relay operation has been introduced to a wireless local area network (WLAN) to expand a coverage range of an access point (AP) and reduce power consumption of a station. When the AP transmits data to the station, transmission efficiency may decrease due to an obstacle present between the AP and the station. Also, when the station transmits data to the AP, the station may not appropriately transmit the data to the AP although the station receives the data from the AP because transmission power of the station is lower than that of the AP. Thus, a relay may be used to solve such an issue and expand a coverage range for transmission performed between the AP and the station.

A conventional relay may mainly use a channel identical to a channel used by a root AP. That is, a root basic service set (BSS) set up by the root AP and BSSs set up by relays may operate in an identical channel. In such a case, the root AP BSS and the relay BSSs may overlap to result in an overlapping BSS (OBSS) issue, and contend or collide with one another. Thus, using the relay may lead to a greater frequency of contention and collision between the root BSS and the relay BSSs due to the OBSS despite an extended range for transmission.

DISCLOSURE OF INVENTION

Technical Goals

An aspect of the present invention provides a channel allocating method efficient in transmission performed using a relay in a wireless local area network (WLAN), and more particularly, the channel allocating method for the relay to reduce collision between a root basic service set (BSS) and relay BSSs and increase transmission efficiency for transmission using the relay in a WLAN environment.

Another aspect of the present invention provides a channel allocating method using a relay in a WLAN, and more particularly, the channel allocating method that may include setting a root BSS and relay BSSs in different channels and using the different channels for transmission performed by a relay access point (AP) in a relay BSS and transmission performed with a root AP.

Technical Solutions

According to an aspect of the present invention, there is provided an operating method of an access point (AP) including transmitting a first signal including first information indicating whether use of an overlapping channel is restricted, receiving a second signal including second information indicating whether an operation using a non-overlapping channel is supported by a relay, and third information indicating whether use of a channel identical to a channel used by the AP is requested, and determining whether to associate with the relay based on at least one of the first information, the second information, and the third information.

The overlapping channel may be a channel in which a basic service set (BSS) of the AP overlaps a BSS of the relay. The non-overlapping channel may be a channel in which the BSS of the AP does not overlap the BSS of the relay.

The first information may include a first bit of a predetermined subfield included in a relay element to be transmitted by the AP. The second information may include a second bit of the predetermined subfield included in a relay element to be transmitted by the relay. The third information may include a third bit of the predetermined subfield included in a relay element to be transmitted by the relay.

The determining may include determining to reject association with the relay when the first information indicates that the use of the overlapping channel is restricted, the second information indicates that the operation using the non-overlapping channel is supported by the relay, and the third information indicates that the use of the channel identical to the channel used by the AP is requested.

The determining may include determining to accept association with the relay when the second information indicates that the operation using the non-overlapping channel is not supported by the relay.

The first signal may be included in at least one of a beacon signal and a probe response signal. The second signal may be included in at least one of an association request signal and a probe request signal.

The at least one of the beacon signal and the probe response signal may further include channel information on at least one neighboring AP of the AP, and the association request signal may further include a list of candidate channels desired to be used by the relay. The determining may include determining whether to accept the association with the relay based on the channel information and the list of the candidate channels.

According to another aspect of the present invention, there is provided an operating method of a relay including receiving, from an AP, a first signal including first information indicating whether use of an overlapping channel is restricted, transmitting a second signal including second information indicating whether an operation using a non-overlapping channel is supported and third information indicating whether use of a channel identical to a channel used by the AP is requested, and receiving a response signal indicating an acceptance or a rejection of association with the AP. Whether the association with the AP is accepted or rejected may be determined based on at least one of the first information, the second information, and the third information.

The overlapping channel may be a channel in which a basic service set (BSS) of the AP overlaps a BSS of the relay. The non-overlapping channel may be a channel in which the BSS of the AP does not overlap the BSS of the relay.

The first information may include a first bit of a predetermined subfield included in a relay element to be transmitted by the AP. The second information may include a second bit of the predetermined subfield included in a relay element to be transmitted by the relay. The third information may include a third bit of the predetermined subfield included in a relay element to be transmitted by the relay.

When the first information indicates that the use of the overlapping channel is restricted, the second information indicates that the operation using the non-overlapping channel is supported by the relay, and the third information indicates that the use of the channel identical to the channel used by the AP is requested, the associated with the AP may be rejected.

When the second information indicates that the operation using the non-overlapping channel is not supported by the relay, the association with the AP may be accepted.

The first signal may be included in at least one of a beacon signal and a probe response signal. The second signal may be included in at least one of an association request signal and a probe request signal.

The at least one of the beacon signal and the probe response signal may further include channel information on at least one neighboring AP of the AP, and the association request signal may further include a list of candidate channels desired to be used by the relay. Whether the association with the AP is accepted or rejected may be further determined based on the channel information and the list of the candidate channels.

According to still another aspect of the present invention, there is provided an operating method of an AP including receiving, from a station, relay capability information indicating whether the station is operable as a relay and a relay operation request requesting an operation as the relay, determining whether to allow the station to operate as the relay based on the relay capability information and the relay operation request, and transmitting, to the station, a result of the determining.

According to yet another aspect of the present invention, there is provided an operating method of a station including transmitting, to an AP, relay capability information indicating whether the station is operable as a relay and a relay operation request requesting an operation as the relay, and receiving, from the AP, a result of determining whether to allow the station to operate as the relay. The result of the determining may be determined based on the relay capability information and the relay operation request.

BRIEF DESCRIPTION OF DRAWINGS

FIG. 6 is a diagram illustrating an example of a configuration of a relay channel control field.

BEST MODE FOR CARRYING OUT INVENTION

Figure 1:
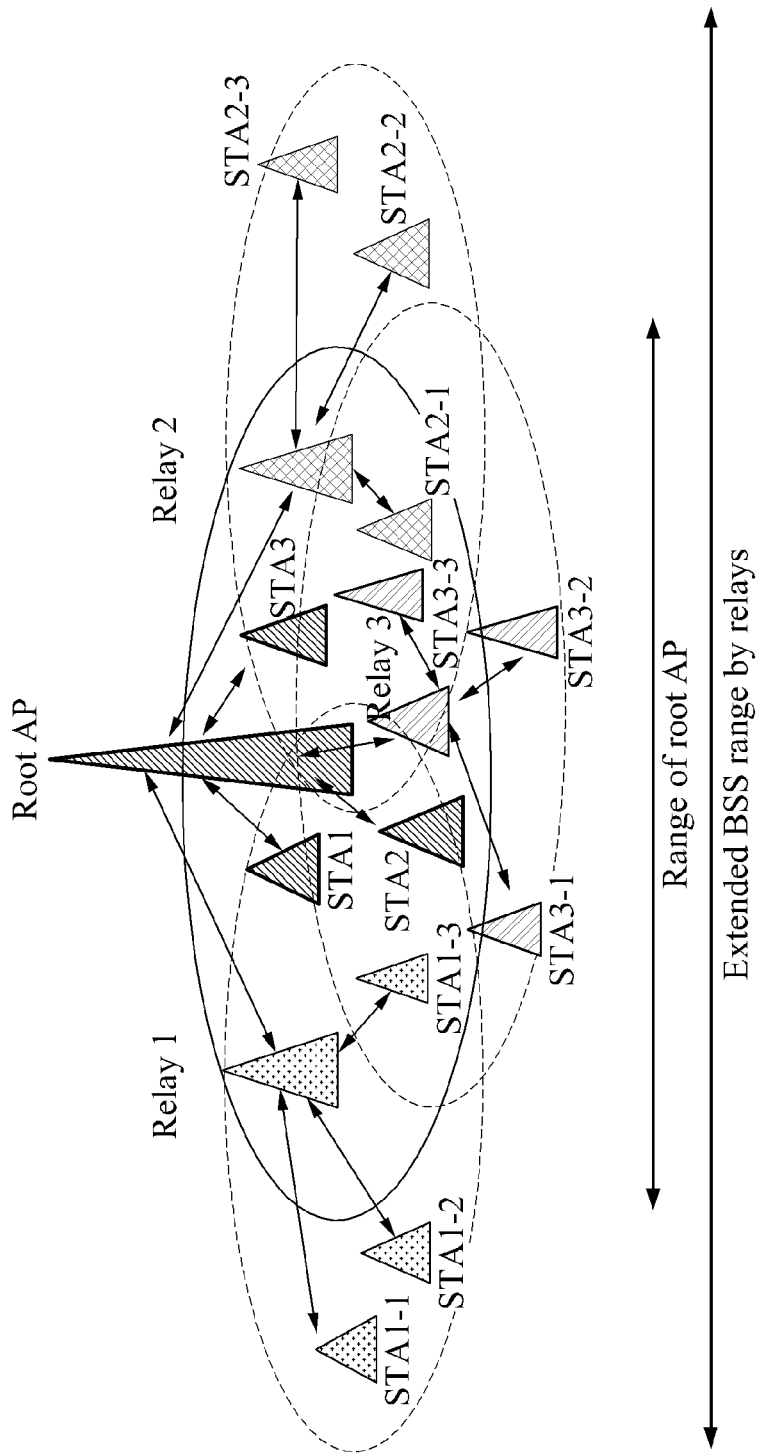
FIG. 1 is a diagram illustrating an example of a transmission method using a relay in a wireless local area network (WLAN).

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating an example of a transmission method using a relay in a wireless local area network (WLAN). Referring to FIG. 1, a root access point (AP) may transmit data to stations present outside of a range of the root AP, for example, STA 1-1, STA 1-2, STA 2-2, STA 2-3, STA 3-1, and STA 3-2, using a first relay (Relay 1), a second relay (Relay 2), and a third relay (Relay 3). The root AP may transmit data to stations present within a basic service set (BSS) range extended by the relays.

Figure 2:
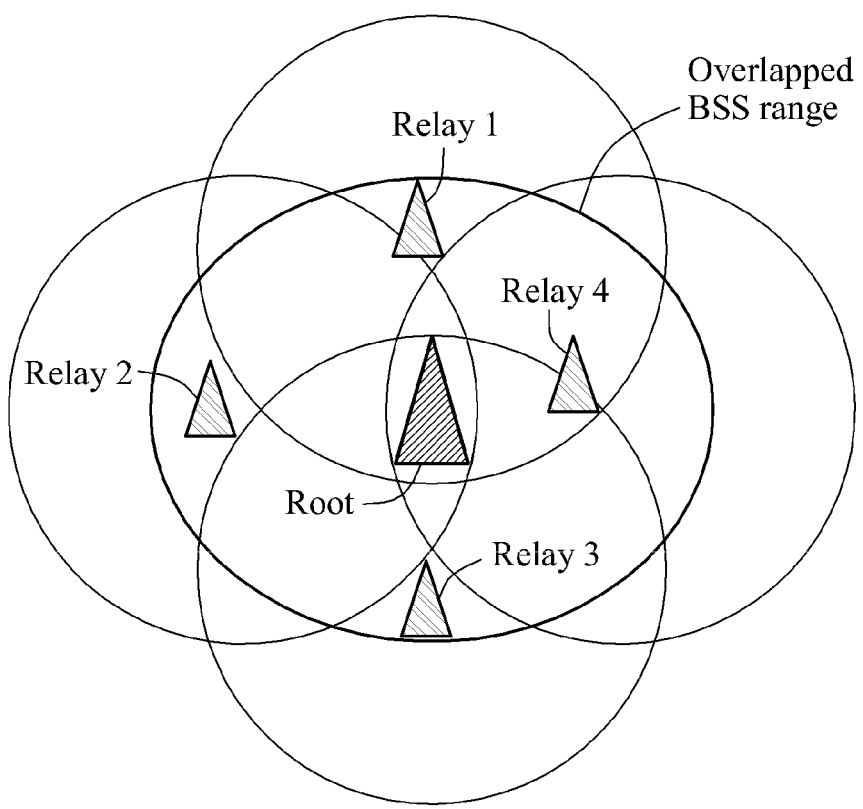
FIG. 2 is a diagram illustrating an example of an overlapping basic service set (OBSS) issue in transmission performed using a relay.

FIG. 2 is a diagram illustrating an example of an overlapping BSS (OBSS) issue that may occur in transmission performed using a relay. A conventional relay may use a channel identical to a channel used by a root AP. For example, a root BSS set up by the root AP and relay BSSs set up by relays may operate in identical channels. Referring to FIG. 2, although a range is extended by using the relay, the OBSS issue may necessarily occur between the root BSS and the relay BSSs when the root BSS and the relay BSSs operate in the identical channels. Thus, a frequency in contention and collision may increase within an OBSS range.

A Method of Allocating a Root BSS and a Relay BSS to Different Channels

Figure 3:
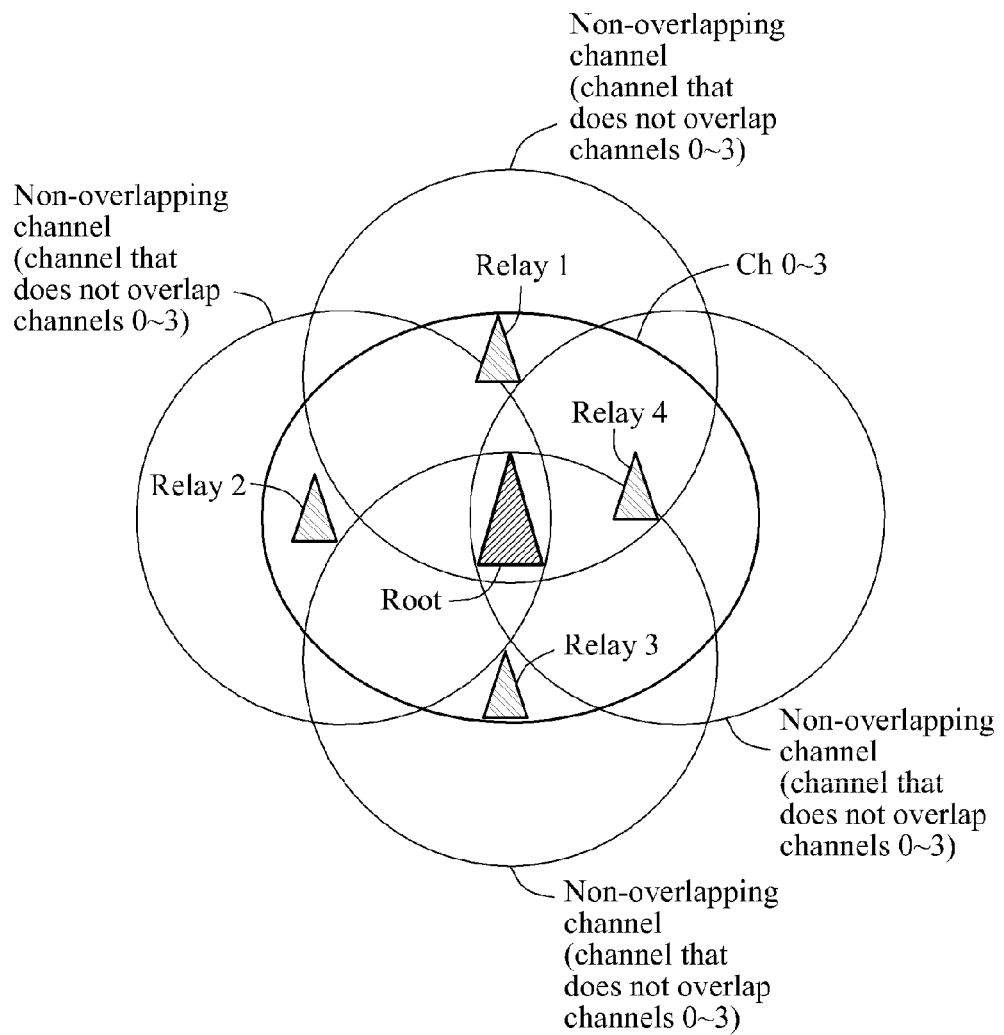
FIG. 3 is a diagram illustrating an example of a method of allocating a root basic service set (BSS) and a relay BSS to different channels.

FIG. 3 is a diagram illustrating an example of a method of allocating a root BSS and a relay BSS to different channels.

Example embodiments provided herein relate to a channel allocating method for a relay that may reduce collisions between a root BSS and relay BSSs and increase transmission efficiency in transmission performed using the relay in a WLAN environment.

When an extended BSS is formed using a relay, a most severe case of an OBSS issue may occur between the root BSS and the relay BSSs. For example, each relay AP may be set up in a range of a root AP because the relay AP is required to listen to a beacon of the root AP. Thus, an overlapping area may be large between the root BSS and the relay BSSs and the OBSS issue may occur most severely. However, a relay may not be required to exist in a range of a different relay and thus, an overlapping area may be small and the OBSS issue may occur at a relatively lower frequency.

In data transmission performed with the root BSS, a relay may aggregate data transmitted from a station associated with the relay in a relay BSS of the relay and transmit the data to the root AP. The root AP may aggregate data to be transmitted to terminals belonging to the relay BSS and transmit the data to a corresponding relay AP. Thus, traffic in the root BSS may be greater than traffic in the relay BSS. When transmission in the relay BSS obstructs transmission in the root BSS, an overall transmission efficiency of the extended BSS may decrease.

According to an embodiment of the present invention, the root BSS and the relay BSS may be set in different channels. For example, when the root AP allocates channels 0 through 3 (Ch 0~3) to the root BSS, relays may allocate, to respective relay BSSs, a channel that does not overlap with the channels 0 through 3 allocated to the root BSS in order not to obstruct the transmission in the root BSS and to prevent collision between the root AP and the relay AP.

Thus, the root BSS and the relay BSSs may perform data transmission without mutual obstruction. A channel used by the root AP, for example, the channels 0 through 3, may be used for transmission between the root AP and the relay AP. A different channel that is not used by the root AP may be used for transmission between a relay in a corresponding relay BSS and a station associated with the relay. The relay AP may use different channels for the transmission in the relay BSS and the transmission with the root AP.

Figure 4:
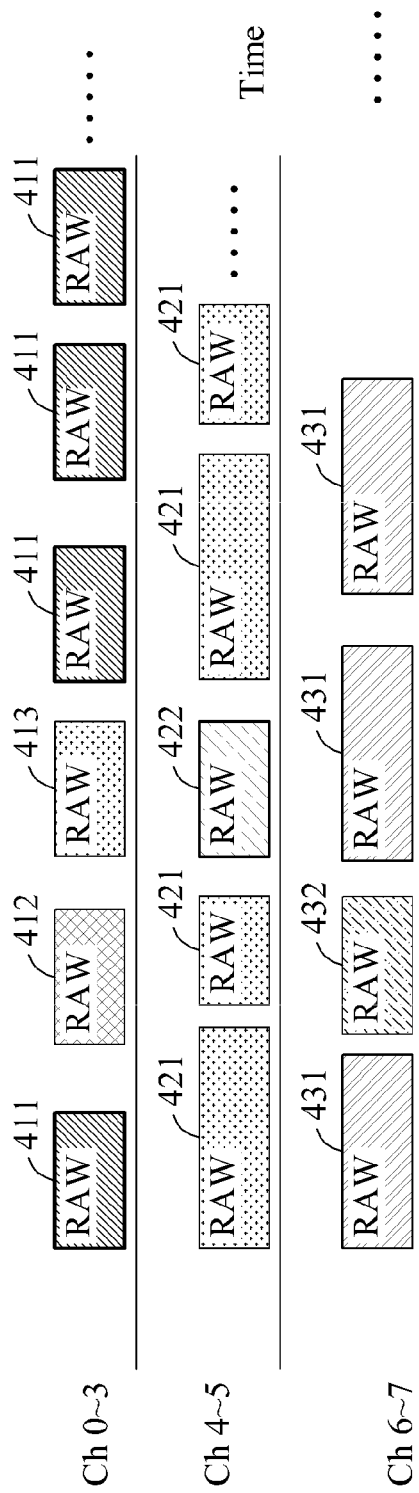
FIG. 4 is a diagram illustrating an example of a method of allocating a root BSS and a relay BSS to different channels and performing transmission.

FIG. 4 is a diagram illustrating an example of a method of allocating a root BSS and a relay BSS to different channels and performing transmission.

A variety of channel access methods using a WLAN, for example, standards defined in an Institute of Electrical and Electronics Engineers (IEEE) 802.11ah standard including a carrier sense multiple access with collision avoidance (CSMA/CA) method, a slotted CSMA method using a restricted access window (RAW), and a method using target wake time (TWT), may be applied to transmission between a root AP and a relay, transmission between the root AP and a station belonging to a root BSS, and transmission between a relay AP and a station belonging to a relay. For ease of description, a transmission method using the RAW will be described as an example hereinafter.

According to an embodiment, a channel not overlapping a channel allocated to the root BSS may be allocated to a relay BSS. Further, a channel not overlapping the channel allocated to the root BSS and channels allocated to other relay BSSs may be allocated to the relay BSS.

In a channel used by the root AP, the root AP may perform transmission with a station and a relay that are directly associated with the root AP. When the method using the RAW is applied, a RAW may be allocated to a station and a relay that directly communicate with the root AP. Here, a RAW allocating method for a general station may be applicable to a RAW allocating method for a relay and the root AP.

Referring to FIG. 4, the root AP may allocate a RAW using channels 0 through 3 (Ch 0~3). A RAW 411 may be used for transmission between the root AP and a station in the root BSS. A RAW 412 may be used for transmission between the root AP and a second relay. A RAW 413 may be used for transmission between the root AP and a first relay.

Each relay may perform transmission in a channel in which the relay sets up a relay BSS. The relay may use a channel different from a channel used by the root AP and thus, transmission in the relay BSS, for example, transmission between a relay AP and a station in a relay AP BSS, and transmission in the root BSS, for example, transmission between the root AP and a station in the root BSS, may be independently performed.

For example, when an identical channel is allocated to a first relay BSS and a second relay BSS, the first relay and the second relay may need to allocate a RAW to a section in which transmission does not overlap.

However, when the first relay and the second relay use different channels, transmission in the first relay BSS and transmission in the second relay BSS may also be independently performed.

For example, the first relay may allocate a RAW in the relay BSS using channels 4 and 5 (Ch 4~5). Here, a RAW 421 may be used for transmission between the first relay and a station in the first relay BSS. A RAW 422 may be set by the first relay to prevent the transmission in the first relay BSS because reception in the first relay BSS is not available when the first relay performs transmission with the root AP using a different channel, for example, the channels 0 through 3 used by the root AP. For example, as the RAW 422, an AP power management (PM) RAW of 11ah or a newly defined form of a RAW may be used. During a section set in the RAW 422, the transmission in the first relay BSS may be restricted. Stations in the first relay BSS may become aware of the section during which the transmission is restricted based on information about allocation of the RAW 422.

In addition, the second relay may allocate a RAW using channels 6 and 7 (Ch 6~7). Here, a RAW 431 may be used for transmission between the second relay and a station in a second BSS. A RAW 432 may be set by the second relay to prevent transmission in the second relay BSS because reception in the second relay BSS is not available when the second relay performs transmission with the root AP using a different channel, for example, the channels 0 through 3 used by the root AP. For example, as the RAW 432, an AP PM RAW or a newly defined form of a RAW may be used. During a section set in the RAW 432, the transmission in the second relay BSS may be restricted. Stations in the second relay BSS may become aware of the section during which the transmission is restricted based on information about allocation of the RAW 432.

Transmission between a relay and the root AP may be performed in a time section allocated for uplink transmission and/or downlink transmission between the relay and the root AP, for example, a RAW allocated by the root AP. In such a case, the relay may perform the uplink transmission and/or the downlink transmission using a channel used by the root AP.

Since a relay uses a channel different from a channel used by a corresponding relay BSS during transmission with the root BSS, the relay may not be able to receive a signal transmitted from a station belonging to the relay unless the relay possesses two modems. Thus, when the root BSS and the relay BSS use different channels, the relay may need to restrict transmission in the relay BSS in a time section during which the relay performs transmission with the root BSS using a different channel, for example, a channel used by the root AP.

The relay may set a RAW to restrict the transmission by a station belonging to the relay in a time section during which the relay communicates with the root AP using the different channel, for example, the channel used by the root AP. For example, the relay may set, as a RAW, the time section during which the relay communicates with the root AP, and may not allocate resources to stations belonging to the relay, or may indicate a power saving RAW or an AP PM RAW, to inform a station associated with the relay through a relay beacon.

Allocation relating to transmission between the root AP and a relay AP and transmission between the root AP and a station belonging to the root BSS, for example, allocation of a channel used by the root AP, may be indicated in a beacon of the root AP. A section for transmission between the relay AP and a station belonging to the relay BSS may be indicated in the relay beacon. Thus, the station associated with the relay may become aware of allocation information about the station only by listening to the relay beacon.

When the TWT method is used, the root AP may allocate a TWT to a station belonging to the root AP or a relay AP for a transmission section during which transmission is performed by the root AP, for example, a section for transmission between the root AP and the station belonging to the root AP (a time section corresponding to the RAW 411 in FIG. 4), or a transmission section between the root AP and the relay AP (a time section corresponding to the RAW 412 and RAW 413 in FIG. 4). In addition, a relay may allocate a TWT to a corresponding station for a section during which the relay AP performs transmission in a relay BSS, for example, a transmission section between the relay AP and a station belonging to the relay AP (a time section corresponding to the RAW 421 for the first relay (Relay 1) or the RAW 431 for the second relay (Relay 2) in FIG. 4).

To restrict transmission in the relay BSS in which the relay performs the transmission to the root AP, the relay may not allocate the TWT to the station belonging to the relay BSS in a corresponding transmission section, for example, a time section corresponding to the RAW 422 for the first relay or a time section corresponding to the RAW 432 for the second relay. When the root AP does not allocate, to any station in the relay BSS, a TWT with respect to a section, transmission in the relay BSS may be restricted during the section because only a station to which the TWT is allocated is able to perform transmission during the section.

The RAW allocating method and the TWT method may be combined for use. For example, the root AP may allocate a TWT to a portion of stations and a RAW to remaining stations for transmission to the relay and transmission in a BSS of the root AP. In addition, the relay AP may allocate a TWT to a station or a RAW to another station for transmission in a BSS of the relay AP.

In a case of a station that does not use a RAW or a TWT, when the station transmits a power save poll (PS-Poll) to a relay for reception from the relay, but the relay lacks sufficient time to immediately transmit data to the station, the relay may include, in an acknowledgement (ack), a next point in time at which the transmission is available in the relay BSS and perform the transmission and thus, the station may perform the transmission in a different time section. In such a case, time may need to be allocated to allow the station not to perform the transmission at a point in time at which the relay and the root AP perform the transmission.

The root AP may inform a relay AP desiring to set up a relay BBS of whether the root AP accepts the relay AP to set up the relay BBS using a channel identical to a channel used by the root BSS. Here, a "DisallowOverlappedChannel" bit may be used.

The root AP may include, in a beacon or a probe response, information, for example, "DisallowOverlappedChannel=0 or 1," to indicate whether the root AP accepts the setup of the relay BSS in a channel overlapping a channel used by the root BSS.

The relay may verify such information. For example, when "DisallowOverlappedChannel" is "1," which indicates a disallowance of use of an identical channel, the relay BSS may be set up in a channel different from the channel used by the root BSS. Conversely, when "DisallowOverlappedChannel" is "0," the relay BSS may be set up in the identical channel or the different channel.

In addition, when the relay requests association to the root AP, the relay may indicate whether the relay uses a channel identical to a channel used by the root AP. Here, a "RequestSameChannel" bit may be used.

When the relay AP sets up the relay BSS in the channel different from the channel used by the root BSS, the relay AP may need to use different channels for transmission performed with the root AP and transmission performed with a station in the relay BSS. Here, frequent channel switches may be required. A channel switch may be possible or impossible depending on a capability of the relay AP.

The relay AP may inform the root AP of whether the relay AP possesses the capability for the channel switch required for a relay operation in the different channel. Here, a "RelayChannelSwitchCapable" bit may be used. For example, only a relay AP indicating that "RelayChannelSwitchCapable" is "1," for example, a relay AP capable of performing an operation of setting up a relay in a channel different from a channel used by the root AP, may perform the setup in the channel different from the channel used by the root AP. Here, a "NonOverlappingChannelCapable" bit may be used in lieu of the "RelayChannelSwitchCapable" bit.

The root AP may indicate "DisallowOverlappedChannel=1" in the beacon or the probe response to disallow the use of the identical channel. The root AP may reject the association with the relay when the relay requests the association, "RelayChannelSwitchCapable" is "1" (possible to set up the BSS in the different channel), and the use of the channel identical to the channel used by the root AP is requested, for example, "RequestSameChannel=1." However, the root AP may accept the request for the use of the identical channel when "RelayChannelSwitchCapable" is "0" (impossible to set up the BSS in the different channel).

Figure 5:
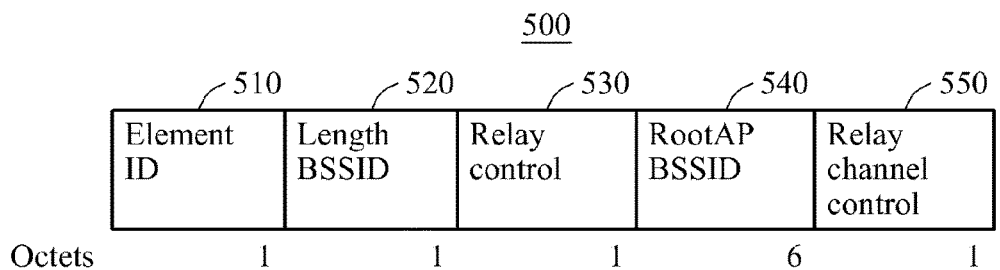
FIG. 5 is a diagram illustrating an example of an extended relay element.

Hereinafter, examples of a frame format for the foregoing information will be described with reference to FIGS. 5 and 6. FIG. 5 is a diagram illustrating an example of an extended relay element 500. Referring to FIG. 5, the extended relay element 500 additionally includes a relay channel control field 550 subsequent to a relay element defined in an IEEE 802.11ah standard. The extended relay element 500 may include at least one of an element identification (ID) field 510, a length field 520, a relay control field 530, and a root AP BSSID field 540 defined in the IEEE 802.11ah standard.

FIG. 6 is a diagram illustrating an example of a configuration of the relay channel control field 550 illustrated in FIG. 5. Referring to FIG. 6, the relay channel control field 550 includes at least one of a "DisallowOverlappedChannel" bit 551, a "RelayChannelSwitchCapable" bit 552, and a "RequestSameChannel" bit 553.

The DisallowOverlappedChannel bit 551 may be set by a root AP, and indicate whether to allow a relay AP to set up a relay BSS using a channel overlapping a channel used by a root BSS.

The RelayChannelSwitchCapable bit 552 may be set by a relay, and indicate whether the relay sets up a relay BSS in a different channel from a channel used by a root BSS and a channel switch operation is available between the root BSS and the relay BSS. The RelayChannelSwitchCapable bit 552 may be substituted by a "NonOverlappingChannelCapable" bit.

The RequestSameChannel bit 553 may be set by a relay, and indicate, when associating with the root AP, whether the relay desires to use a channel identical to a channel used by the root AP in the relay BSS.

Figure 7:
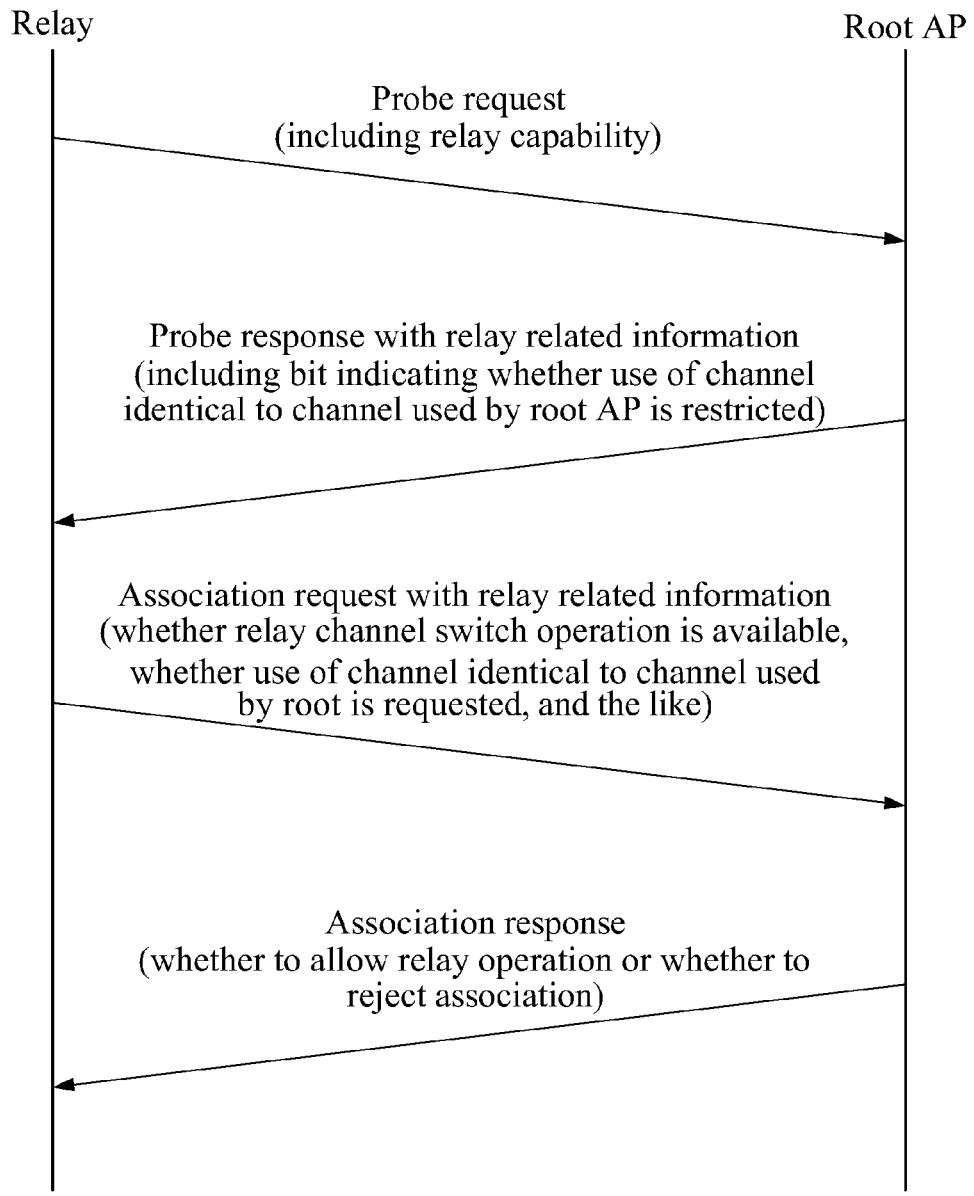
FIG. 7 is a diagram illustrating an example of a relay channel allocating procedure.

FIG. 7 is a diagram illustrating an example of a relay channel allocating procedure.

Referring to FIG. 7, a root AP includes, in a beacon or a probe response, information, for example, "RelayChannelControl" information, indicating that "DisallowOverlappedChannel" is "0" or "1," to indicate whether use of a channel identical to a channel used by the root AP is restricted.

When a relay sends a probe request and active scanning is performed, the relay may include an element indicating information about a relay operation in the probe request and inform the root AP in advance of whether the relay has a capability, for example, "RelayChannelSwitchCapable" information. In addition, the probe request may also include "RequestSameChannel" information. Thus, the relay may send a request to the root AP regarding the relay operation in the identical channel, and inform the root AP of information about the relay operation, for example, a related relay capability and a requested channel.

When the relay requests association, a relay AP may include the RelayChannelSwitchCapable information and/or the RequestSameChannel information in the relay capability information of the association request, and transmit the association request to the root AP. For example, the relay AP may include, in the association request, a relay element including the RelayChannelSwitchCapable information and/or the RequestSameChannel information. Thus, the relay may request, to the root AP, the relay operation in the identical channel, and inform the root AP of information about the relay operation, for example, the relay capability and the requested channel.

The root AP may determine whether to allow the relay to perform the relay operation by verifying the relay capability information, for example, the RelayChannelSwitchCapable information and/or the RequestSameChannel information. For example, when "DisallowOverlappedChannel" is "1," for example, indicating that the root AP disallows a relay BSS to use a channel identical to a channel used by the root AP, "RelayChannelSwitchCapable" is "1," and "RequestSameChannel" is "1," the root AP may reject a setup of a relay or association with the relay.

However, when "RelayChannelSwitchCapable" is "0," the use of the identical channel for the relay may be accepted although the root AP disallows the use of the identical channel.

When the root AP accepts the use of the identical channel, the relay may be accepted to use the identical channel irrespective of a value of "RelayChannelSwitchCapable."

When the relay does not request the use of the identical channel, for example, when the relay sets up a relay BSS using a channel different from the channel used by the root AP, the setup may be accepted irrespective of values of "RelayChannelSwitchCapable" and "RequestSameChannel."

When the setup of the relay BSS is accepted by the root AP, the root AP may include, in an association response, an element including information associated with acceptance of the relay operation, for example, a relay element and a relay activation element in which a relay activation bit is set as "1," to indicate that the setup of the relay BSS is accepted. Alternatively, the root AP may transmit a response including separate information associated with the acceptance of the setup of the relay BSS to directly indicate that the setup of the relay BSS, for example, relay activation, is accepted.

When the setup of the relay BSS is not accepted, the root AP may transmit an association response in which a relay element is not included to indirectly indicate that the setup of the relay BSS is not accepted. Alternatively, the root AP may send a response frame including separate information associated with rejection of the setup of the relay BSS, for example, the relay activation element in which the relay activation bit is set as "0," or may not send the association response to reject association with a relay AP.

The root AP may change a decision on an acceptance of the setup of the relay BSS in the identical channel during an operation of an extended BSS. For example, the root AP may initially accept the setup of the relay BSS in the identical channel and then change the decision to reject the setup of the relay BSS. Conversely, the root AP may initially reject the setup of the relay BSS in the identical channel and then change the decision to accept the setup of the relay BSS when the channel is available.

For example, when the root BSS accepts the relay operation in the identical channel after the relay BSS is set up in a channel different from a channel used by the root BSS, the channel of the relay BSS may be transferred to the channel identical to the root channel of the root BSS. The relay may verify whether the root BSS accepts the relay operation in the identical channel by referring to a beacon.

Conversely, when the root AP accepts the use of the identical channel for the relay and then rejects the use of the identical channel, the root AP may inform the relay that the root AP rejects the use of the identical channel through a beacon. For example, the root AP may transmit a "SameChannelIntolerable" bit and the like through the beacon. In such a case, the channel of the relay BSS using the channel identical to the channel used by the root AP may be forced to transfer to another channel.

Here, when "SameChannelIntolerable" is "1," the relay BSS using the identical channel may be required to transfer the channel. Conversely, when "SameChannelIntolerable" is "0," the relay BSS previously using the identical channel may not be required to transfer the channel and set up a relay BSS only for a relay that newly sets up the relay BSS in a channel different from the channel used by the root BSS.

Figure 8:
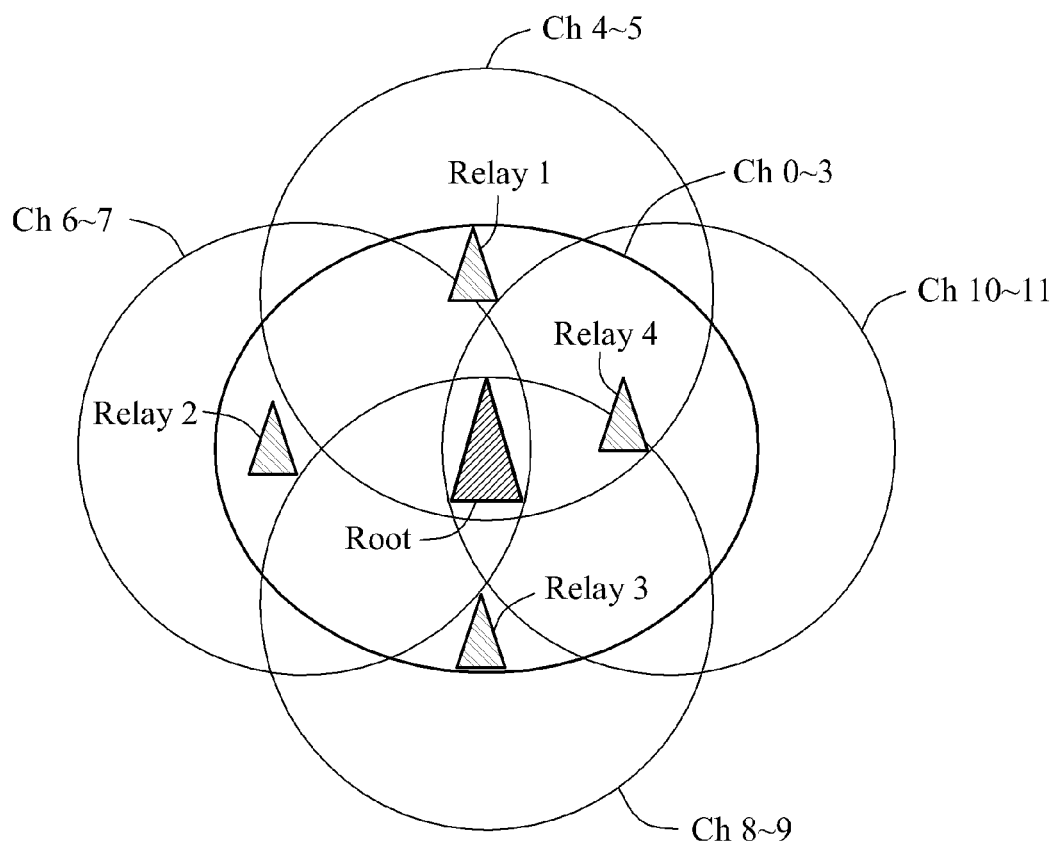
FIG. 8 is a diagram illustrating an example of a method of allowing relay BSSs to be allocated to different channels.

A Method of Allocating a Root BSS and a Relay BSS to Different Channels and Allocating Relay BSSs to Different Channels FIG. 8 is a diagram illustrating an example of a method of allocating relay BSSs to different channels. Referring to FIG. 8, a root BSS and a relay BSS are allocated to different channels, and the relay BSSs are allocated to different channels. Thus, relays may operate in different channels and accordingly, contention and collision among the relays may be reduced.

According to an embodiment, each relay may scan whether a channel identical to a channel used by a root AP is used and also which channel is used by another relay that is already set up, and select a non-overlapping channel to be used.

For example, a first relay may be aware of information on a channel adjacent to the first relay. A second relay may be hidden from the first relay. However, a station of the second relay may cause interference with the first relay or a station to be associated with the first relay.

Thus, although being hidden from the first relay, information about another relay associated with the root AP, for example, the second relay, may be required. The root AP may listen to beacons of all relays and be aware of channels used by the relays and thus, the root AP may send the information to a relay AP.

For example, to select a channel in which a BSS is to be set up, the relay AP may combine a result of scanning channels and information on relay APs transmitted from the root AP, and may select the channel.

The root AP may transmit, to a relay, information on an existing relay associated with the root AP, for example, used channel and bandwidth information. The root AP may include the information in a beacon or a probe response and transmit the beacon or the probe response to the relay. For example, the root AP may include, in the beacon or the probe response, a reduced neighbor report defined in an IEEE 802.11af standard and/or an IEEE 80.211ai standard, and transmit the beacon or the probe response including the reduced neighbor report to the relay.

When the relay transmits, to the root AP, a probe request including an element including information associated with the relay, for example, a relay element, the root AP may determine that a corresponding station desires to operate as the relay and transmit the reduced neighbor report including neighboring relay information.

Here, to reduce neighboring AP information, only the information on a relay included in the root AP may be included. Alternatively, information, for example, target beacon transmission time (TBTT), may be omitted from the reduced neighbor report defined in the IEEE 802.11af standard and/or the IEEE 802.11ai standard. Thus, a further reduced neighbor report only including a list of BSSIDs of relay APs, operating classes, and channel numbers may be included in the beacon or the probe response to be transmitted.

To transmit more detailed information on a neighbor of the root AP, information on other APs adjacent to the root AP in addition to the relay AP may be included in the beacon or the probe response to be transmitted. In addition, information on, for example, channel load, may be included in the beacon or the probe response to be transmitted and assist the relay AP in selecting the channel.

The relay AP may determine a list of candidate channels desired to be used based on the neighboring AP information received from the root AP and a result of directly scanning neighboring channels of the relay AP. The relay AP may transmit, to the root AP, an association request including the list of the candidate channels.

The root AP may determine a final relay BSS channel to be used by the relay AP based on the list of the candidate channels, channels used by all relay APs, and whether use of a channel identical to a channel used by the root AP is accepted. When the relay accepts the setup of the relay BSS, for example, when relay activation is accepted, the root AP may transmit an association response including an element including information associated with an acceptance of a relay operation, for example, a relay element or a relay activation element in which a relay activation bit is set as "1," and information on the final relay BSS channel to be used by the relay AP.

Figure 9:
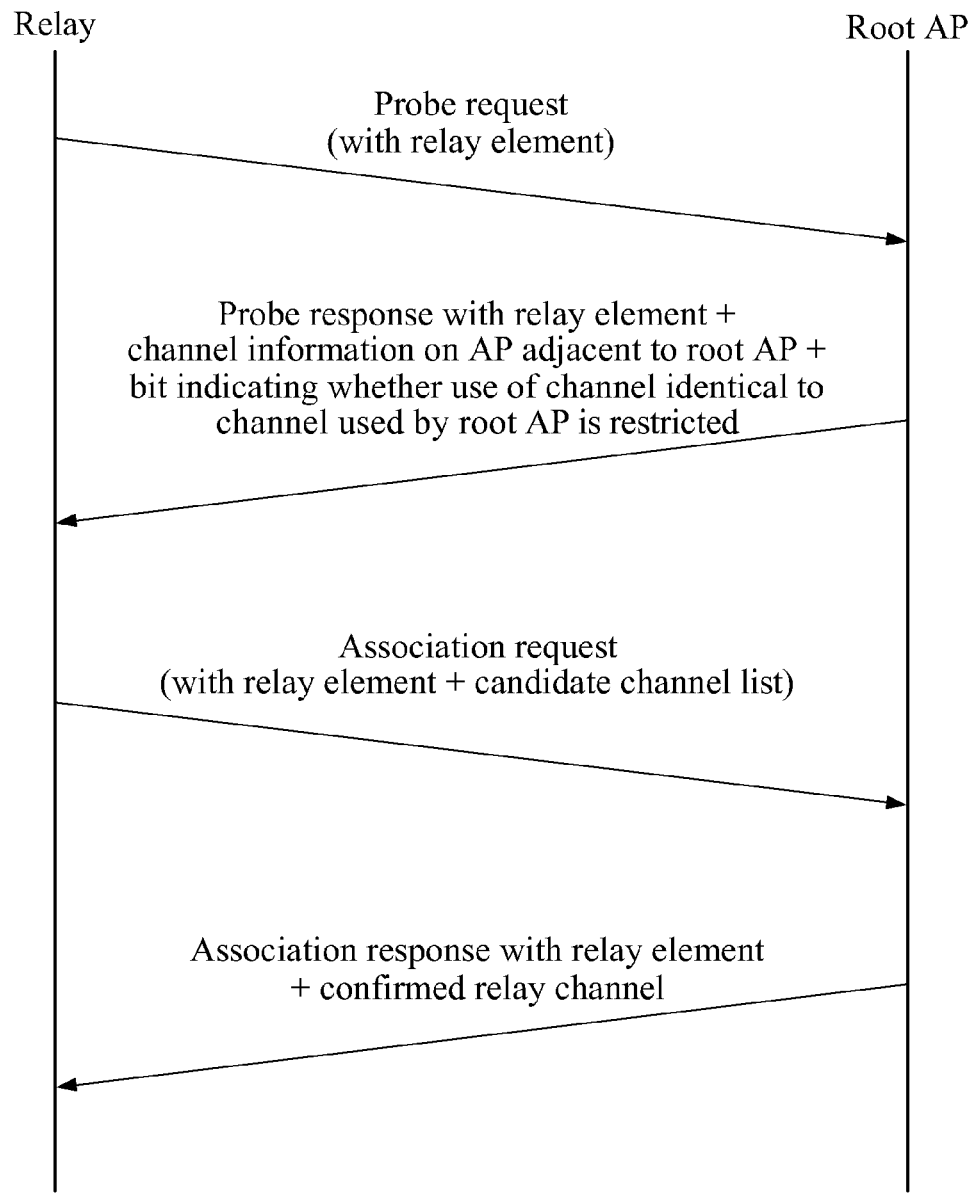
FIG. 9 is a diagram illustrating an example of a relay BSS allocating procedure using different channels.

FIG. 9 is a diagram illustrating an example of a relay BSS allocating procedure using different channels.

Referring to FIG. 9, a relay channel may be changed based on allocation of all channels of an extended BSS after a relay AP is set up. In such a case, a relay may transmit "RelayBSSSetupChangeRequest" to a root AP, and transmit a list of candidate channels desired to be changed. The root AP may transmit, to the relay, information on channels to be changed in response to the "RelayBSSSetupChangeRequest."

Although the relay does not make such a request, the root AP may instruct the relay to select a channel to be changed and change the channel as necessary.

When the relay requests neighboring AP information from the root AP to change the channel subsequent to a setup of a relay BSS, neighbor report information to be transmitted through a process of a neighbor report request and response may be used. Alternatively, a reduced neighbor report to be transmitted through inclusion in a beacon may be used.

When a neighbor report defined in an IEEE 802.11 standard is used, information on whether a neighboring AP is an AP supported by an IEEE 802.11ah standard may not be provided. Thus, "1" bit may be added to a BSSID information field of the neighbor report defined in the IEEE 802.11 standard. The 1 bit to be added may be an 11ah AP bit. Thus, information on whether the neighboring AP is the AP supported by the IEEE 802.11ah standard may be provided using the 11ah AP bit.

Example embodiments may be described as in Table 1.

TABLE 1

| Discussion |
| --- |
| Each relay may establish a relay BSS. Since the relay BSS overlaps a root AP BSS, contention and collision may occur more frequently in an extended BSS using the relay in comparison to a single BSS without using the relay, although the extended BSS using the relay forms a single extended BSS. For example, when a root AP and relays set up BSSs using an overlapping channel, the contention and collision may occur more frequently. Thus, coordinated transmission may be required between the root AP and the relays. According to an embodiment, a non-overlapping channel in which the relay BSS does not overlap the root BSS may be used for the coordinated transmission in the extended BSS.<br>OBSS issue in a relay operation |
| Relay stations may be permanently present within a range of the root AP and thus, the relay BSS overlaps the root BSS. When relay BSSs use a channel identical to a channel used by the root BSS, an OBSS issue may occur. In such an OBSS situation between the root AP and the relays, a media access control (MAC) efficiency may decrease. According to an embodiment, the OBSS issue may be solved by allowing the relay BSSs to use non-overlapping channels in which the relay BSSs do not overlap the root BSS. Since the relays and the root AP may exchange aggregated frames with each other, channels to be used by the root BSS may have a high load. The aggregated frames may be transmitted to a plurality of stations in each BSS or received from the stations in each BSS. According to an embodiment, allowing the relay BSSs to use the non-overlapping channels may prevent transmission in the relay BSS from interfering in transmission in the root BSS.<br>Approach: using the non-overlapping channels that do not overlap the channel used by the root BSS for the relay BSSs |
| The root AP may indicate whether to accept the relay to set up the relay BSS using an overlapping channel that overlaps the channel used by the root BSS. The root AP may reject an association with the relay when the relay requests the overlapping channel although the root AP does not accept the use of the overlapping channel.<br>Relay element |
| A relay element may include parameters required for supporting a relay operation. A relay control subfield may indicate whether an AP is the root AP or whether the AP relays a service set identification (SSID). |

TABLE 1-continued

A relay channel control subfield may include a "DisallowOverlappingChannel" bit, a "NonOverlappingChannelCapable" bit, and a "RequestSameChannel" bit.
The DisallowOverlappingChannel bit may be set by the root AP. The root AP may set the DisallowOverlappingChannel bit to be "1" to indicate that the relay is not accepted for use of the overlapping channel that overlaps the channel used by the root BSS. Also, the root AP may set the DisallowOverlappingChannel bit to be "0" to indicate that the relay is accepted for use of the overlapping channel that overlaps the channel used by the root BSS.
The NonOverlappingChannelCapable bit may be set by the relay. The relay may be a station possessing a relay capability. The relay may set the NonOverlappingChannelCapable bit to be "1" to indicate that a relay AP included in a relay entity supports an operation using a non-overlapping channel that does not overlap the channel used by the root BSS for the relay BSS. Also, the relay may set the NonOverlappingChannelCapable bit to be "0" to indicate that the relay AP included in the relay entity does not support the operation using the non-overlapping channel that does not overlap the channel used by the root BSS for the relay BSS.
The DisallowOverlappingChannel bit may be set by the relay. The relay may be a station possessing the relay capability. The relay may set the DisallowOverlappingChannel bit to be "1" to indicate that the relay AP included in the relay entity requests the overlapping channel that overlaps the channel used by the root BSS for the relay BSS. Also, the relay may set the DisallowOverlappingChannel bit to be "0" to indicate that the relay AP included in the relay entity does not request the overlapping channel that overlap the channel used by the root BSS for the relay BSS.

Relay operation

Hereinafter, a station will refer to a station in lieu of an AP.
An AP in which "dot11RelayAPActivated" is set to be "true" may operate as a relay AP.
A station for which "dot11RelaySTACapable" is set to be "true" may include a relay element in an association or a probe request. The relay AP may include the relay element in a transmitted beacon and a probe request frame.
Logically, a relay may be an entity including a relay AP and a relay station.
When an association response including the relay element is received, the station for which "dot11RelaySTACapable" is set to be "true" may be a relay station.
When a co-located relay station is associated with the relay AP, the relay AP may not set a relay control field of the transmitted relay element to be "0."
A root AP may be defined as the relay AP setting the relay control field of the transmitted relay element to be "0."
A relay AP, which is not the root AP, may use an SSID identical to one associated with the relay AP.
A relay AP, which is not the root AP, may set the relay control field of the transmitted relay element to be "1."
When the following conditions occur, the relay station may transmit a reachable address update frame to an AP associated with the relay station. The reachable address update frame may indicate a current list of reachable addresses.
    1) When a new station is associated with the relay AP
    2) When a station is dissociated with the relay AP or unauthenticated with the relay AP
The relay station may transmit a reachable address element to the relay AP associated with the relay station. The reachable address element may indicate a current list of reachable addresses at a time of the association.
The root AP may set a "DisallowOverlappingChannel" bit of the relay channel control subfield included in the relay element to disallow relays to use the overlapping channel that overlaps the channel used by the root BSS. The relay element may be included in a beacon or a probe response to be transmitted from the root AP. The beacon may be a short beacon, and the probe response may be a short probe response.
The station for which "dot11RelaySTACapable" is set to be "true" may set a "NonOverlappingChannelCapable" bit of the relay channel control subfield included in the relay element to indicate whether the relay AP of the station in the relay entity supports an operation using the non-overlapping channel that does not overlap the channel used by the root BSS. The relay element may be included in a probe request or an association request to be transmitted to the root AP.
The station for which "dot11RelaySTACapable" is set to be "true" may set a "RequestSameChannelCapable" bit of the relay channel control subfield included in the relay element to indicate whether the relay AP of the station uses the overlapping channel that overlaps the channel used by the root BSS for a relay BSS operation. The relay element may be included in the association request to be transmitted when the station requests an association to the root AP.
The root AP may
    1) disallow the relay to use the overlapping channel that overlaps the channel used by the root BSS by setting the DisallowOverlappingChannel bit of the relay channel control subfield to be "1";
    2) indicate that the relay AP of the station in the relay entity is able to support the operation using the non-overlapping channel that does not overlap the channel used by the root BSS by the station for which "dot11RelaySTACapable" is set to be "true" setting the NonOverlappingChannelCapable bit of the relay channel control subfield to be "1"; and
    3) reject the association with the station for which "dot11RelaySTACapable" is set to be "true," when the relay AP of the station indicates the use of the overlapping channel that overlaps the channel used by the root BSS by the station setting the RequestSameChannel bit of the relay channel control subfield in an association request to be "1."

TABLE 1-continued

The root AP may
    allow the relay to use the overlapping channel that overlaps the channel used by the
    root AP when the relay AP of the station indicates that the operation using the non-
    overlapping channel that does not overlap the channel used by the root BSS is not
    supported by the station for which "dot11RelaySTACapable" is set to be "true"
    setting the NonOverlappingChannelCapable bit of the relay channel control subfield
    to be "0."

According to an embodiment, a relay may transmit, to the root AP, relay capability information and a relay operation request. In such a case, the root AP may determine whether to allow the relay to perform a relay operation, and provide a notification of a result of the determining to the relay. Example embodiments may be described as in Table 2.

TABLE 2

A non-AP station for which "dot11RelaySTACapable" is set to be "true" may include a relay activation element in an association request frame, a re-association request frame, or a probe request frame.
The non-AP station for which "dot11RelaySTACapable" is set to be "true" may include the relay activation element in which a relay activation mode subfield is set to be "1" in the association request frame, the re-association request frame, the probe request frame, a relay activation request frame, or a relay activation response frame. The non-AP station for which "dot11RelaySTACapable" is set to be "true" may transmit the relay activation request frame to an associated AP
An AP, which is a receiver intended for a frame including the relay activation element in which the relay activation mode subfield is set to be "1," may respond to an appropriate frame including the relay activation element in which the relay activation mode subfield is set to be "0," for example, a probe, an association, a re-association, and a relay activation response.
The non-AP station for which "dot11RelaySTACapable" is set to be "true" may set "dot11RelaySTAOperation" to be "false" in a situation aside from the following condition 1) or 2).
    1) When the non-AP station for which "dot11RelaySTACapable" is set to be "true"
        receives, from the associated AP, a relay activation element in which an enable relay
        function subfield is set to be "1" and the relay activation mode subfield is set to be
        "0" as a response to the relay activation element transmitted after the enable relay
        function subfield and the relay activation mode subfield are set to be "1,"
    2) When the non-AP station for which "dot11RelaySTACapable" is set to be "true"
        transmits, to the associated AP, a relay activation element in which the enable relay
        function subfield is set to be "1" and the relay activation mode subfield is set to be
        "0" as a response to the relay activation element received after the enable relay
        function subfield and the relay activation mode subfield are set to be "1."
The non-AP station for which "dot11RelaySTACapable" is set to be "true" may set "dot11RelaySTAOperation" to be "true" in the foregoing condition 1) or 2).
The relay activation element may include an element ID field, a length field, and a relay function field. The relay function field may include a relay activation mode subfield, a direction subfield, and an enable relay function subfield.
The enable relay function subfield may indicate the following information.
    i) In a request in which the relay activation mode subfield is set to be "1,"
    i-i) When the direction subfield is set to be "1" from an AP,
    The enable relay function subfield set to be "1" may indicate that the station may operate
    as a relay. The enable relay function subfield set to be "0" may indicate that the AP
    requests termination of a relay function of the station.
    i-ii) When the direction subfield is set to be "0" from the station,
    The enable relay function subfield set to be "1" may indicate that the station desires to
    activate the relay function. The enable relay function subfield set to be "0" may indicate
    that the station desires to terminate the relay function.
    ii) In a response in which the relay activation mode subfield is set to be "0,"
    ii-i) When the direction subfield is set to be "1" from the AP,
    The enable relay function subfield set to be "1" may indicate that the station is allowed
    to
    operate as the relay. The enable relay function subfield set to be "0" may indicate that
    the station is disallowed to operate as the relay.
    ii-ii) When the direction subfield is set to be "0" from the station,
    The enable relay function subfield set to be "1" may indicate that the station activates the
    relay function. The enable relay function subfield set to be "0" may indicate that the
    station terminates the relay function.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. An operating method of an access point (AP) extending a basic service set (BSS) of the APP using a relay, comprising:
   transmitting, to the relay, a first signal comprising first information indicating whether the relay is allowed to set up a relay BSS using the same channels used in the BSS of the AP;
   receiving, from the relay, a second signal comprising second information indicating whether the relay possesses a capability for a channel switch, and third information indicating whether the relay requests the same channel used in the BSS of the AP to set up the relay BSS; and
   determining whether to associate with the relay based on at least one of the first information, the second information, and the third information.

2. The operating method of claim 1, wherein the first information comprises a first bit of a predetermined subfield comprised in a relay element to be transmitted by the AP,
   the second information comprises a second bit of the predetermined subfield comprised in a relay element to be transmitted by the relay, and
   the third information comprises a third bit of the predetermined subfield comprised in a relay element to be transmitted by the relay.

3. The operating method of claim 1, wherein the determining comprises:
   determining to reject association with the relay when the first information indicates that the relay is not allowed to set up the relay BSS using the same channels used in the BSS of the AP, the second information indicates that the relay possesses the capability for the channel switch, and the third information indicates that the relay requests the same channel used in the BSS of the AP to set up the relay BSS.

4. The operating method of claim 1, wherein the determining comprises:
   determining to accept association with the relay when the second information indicates that the relay does not possess the capability for the channel switch.

5. The operating method of claim 1, wherein the first signal is comprised in at least one of a beacon signal and a probe response signal, and
   the second signal is comprised in at least one of an association request signal and a probe request signal.

6. The operating method of claim 5, wherein the at least one of the beacon signal and the probe response signal further comprises channel information on at least one neighboring AP of the AP, and the association request signal further comprises a list of candidate channels desired to be used by the relay, and
   the determining comprises determining whether to accept association with the relay based on the channel information and the list of the candidate channels.

7. An operating method of a relay extending a basic service set (BSS) of an access point (AP), comprising:
   receiving, from the AP, a first signal comprising first information indicating whether the relay is allowed to set up a relay BSS using the same channels used in the BSS of the AP;
   transmitting, to the AP, a second signal comprising second information indicating whether the relay possesses a capability for a channel switch and third information indicating whether the relay requests the same channel used in the BSS of the AP to set up the relay BSS; and
   receiving a response signal indicating an acceptance or a rejection of association with the AP, and wherein whether the association with the AP is accepted or rejected is determined based on at least one of the first information, the second information, and the third information.

8. The operating method of claim 7, wherein the first information comprises a first bit of a predetermined subfield comprised in a relay element to be transmitted by the AP,
the second information comprises a second bit of the predetermined subfield comprised in a relay element to be transmitted by the relay, and
the third information comprises a third bit of the predetermined subfield comprised in a relay element to be transmitted by the relay.

9. The operating method of claim 7, wherein, when the first information indicates that the relay is not allowed to set up the relay BSS using the same channels used in the BSS of the AP, the second information indicates that the relay possesses the capability for the channel switch, and the third information indicates that the relay requests the same channel used in the BSS of the AP to set up the relay BSS, the associated with the AP is rejected.

10. The operating method of claim 7, wherein, when the second information indicates that the relay does not possess the capability for the channel switch, the association with the AP is accepted.

11. The operating method of claim 7, wherein the first signal is comprised in at least one of a beacon signal and a probe response signal, and
the second signal is comprised in at least one of an association request signal and a probe request signal.

12. The operating method of claim 11, wherein the at least one of the beacon signal and the probe response signal further comprises channel information on at least one neighboring AP of the AP, and the association request signal further comprises a list of candidate channels desired to be used by the relay, and
whether the association with the AP is accepted or rejected is further determined based on the channel information and the list of the candidate channels.

* * * * *